Jan. 22, 1929.

R. S. BRUMMETT 1,700,092

VARIABLE IMPEDANCE COIL

Filed Dec. 31, 1926

Witness
Ray Rusher

Inventor
Ralph S. Brummett
by Bair & Freeman Attorneys

Patented Jan. 22, 1929.

1,700,092

UNITED STATES PATENT OFFICE.

RALPH S. BRUMMETT, OF DES MOINES, IOWA, ASSIGNOR, BY MESNE ASSIGNMENTS, TO THE J. C. McADAMS COMPANY, OF LONG ISLAND, NEW YORK.

VARIABLE IMPEDANCE COIL.

Application filed December 31, 1926. Serial No. 158,225.

The object of my invention is to provide variable impedance coils for use in electric arc welding, the coils and their manner of support being of simple, durable and comparatively inexpensive construction.

Still a further object is to provide a supporting construction for the impedance coils which is very simple and easy to assemble.

Still a further object is to provide an adjustable contact mechanism whereby any number of impedance coils may be used for supplying the desired current value to the welding arc.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 2 is a sectional view taken on the line 3—3 of Figure 1.

Figure 3 is a plan elevation of the clamping device for holding the welding rod and Figure 4 is an electrical diagrammatical view illustrating the impedance coils and their electrical relation to the supply current, a work table and the welding rod used when performing a welding operation.

Figure 1:
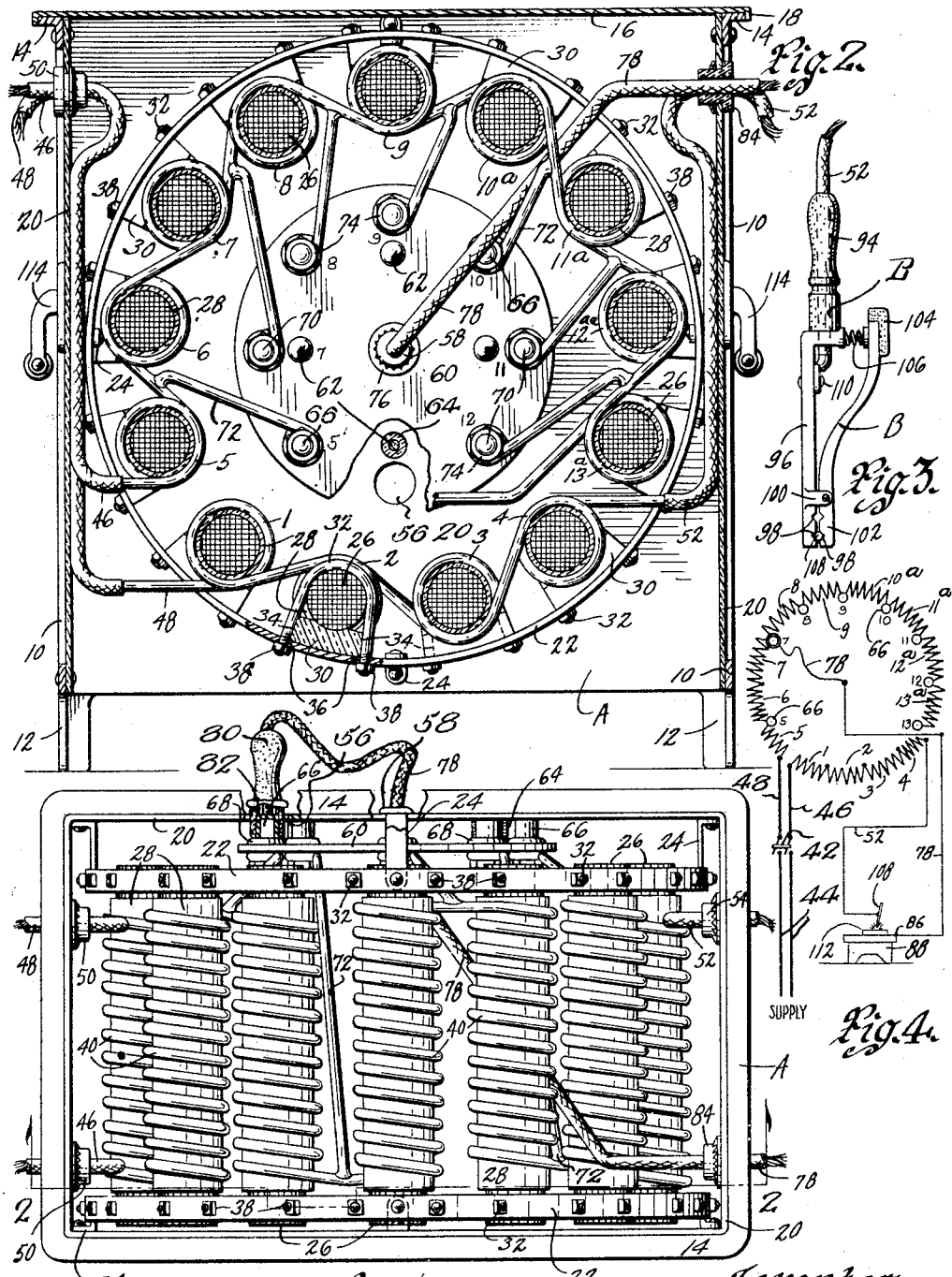
Figure 1 is a plan view of my device, the cover thereof being removed, thereby showing the impedance coils supported within the casing, parts being broken away and shown in section to illustrate an adjustable contact mechanism.

In general, electric welding apparatus is used in the form of a rotary converter or a transformer for reducing the current, which is usually 110 volts, to the proper value for welding purposes. Such devices are very expensive compared to my present invention.

My device comprises a frame 10 having the legs 12 for supporting the frame relative to a floor or the like. The frame 10 includes an outwardly projecting peripheral flange 14 at the top thereof. A cover member 16 is positioned on the top of the frame 10 and has a downwardly extending peripheral flange 18 to engage the flange 14 for properly positioning it. Secured to the frame 10 on all four sides thereof are panels 20 formed of insulating material.

Within the casing A formed by the frame 10, top 16 and panels 20 is a pair of circular coil supporting bands 22. The bands 22 may be formed of iron or some suitable material and are supported relative to the frame 10 by angle brackets 24. The bands 22 are for the purpose of supporting the impedance coils used for reducing the current supplied to the welding arc.

Each of the impedance coils comprise a core 26 formed of annealed iron wires or the like having a layer of insulation 28 thereon. The cores 26 are positioned relative to the bands 22 as clearly illustrated in Figure 3 and have interposed between them and the bands, blocks 30 of insulating material for properly spacing them from the bands. U-bolts 32 are employed to partially encircle the ends of the core 26, to extend through grooves 34 in the blocks 30 and to extend through openings 36 in the bands. The ends of the U-bolts 32 are screw threaded and nuts 38 are positioned thereon for tightly clamping the cores 26 to the supporting bands 22.

From the foregoing it will be obvious that the cores are securely positioned relative to the supporting bands 22 and the bands 22 are securely positioned relative to the frame 10 of the casing A whereby a suitable supporting structure is provided for the impedance coils.

Wound over the insulation 28 of the impedance coils are coils 40 which form a circuit for the welding current. The coils 40 may be made of iron or other suitable material and are comparatively heavy to prevent heating and to allow sufficient current to pass through them for welding purposes. It will be noted that each successive coil is wound in a different direction whereby the magnetic field of one coil is opposite to that of the adjacent coil.

In the installation of my device a switch structure 42 may be provided for controlling the current from the supply wires 44 to the welding apparatus. From the switch 42 current conducting wires 46 and 48 extend through bushings 50 in one of the panels 20. The wire 46 enters the casing A and is connected to the impedance coil 1.

The path of the current can then be traced through the coils 1, 2, 3 and 4 to the wire 52. The wire 52 extends through a bushing 54 in one of the panels 20 of the casing A and from there to the clamping device B.

The wire 46 after entering the casing A extends to the coil 5. The path of the current may then be traced through the coils 5, 6 and 7 in the present instance.

The front panel 20 of the casing A is provided with a series of openings 56 radially arranged around a bushing 58. Supported back of the openings 56 is a disc 60 of insulating material. The disc 60 is supported relative to the front panel 20 by means of rivets or the like 26 extending through both the disc and the panel. Spacer blocks 64 are provided for properly spacing the disc behind the panel as best shown in section in Figure 2.

Radially arranged on the disc 60 and opposite each opening 56 is a contact plug 66. The contact plug 66 has an enlarged flange 68 and a reduced threaded portion 70 extending through the disc 60. This construction is shown in section in Figure 1 of the drawings.

I have given the remaining impedance coils within the casing A the reference numerals 8, 9, 10ª, 11ª, 12ª and 13ª. Extending from the connecting wire between adjacent coils are leads 72. The leads 72 extend to the contact plugs 66 and around the threaded portions 70 thereof. Nuts 74 are then employed to firmly clamp the leads 72 against the disc 60 and to form an electrical connection between the plugs 66 and the leads 72.

The bushing 58 extends through both the front panel 20 and the disc 60 and is held therein by a holding washer 76. Extending through the bushing 58 is a conducting wire 78. The wire 78 extends out of the casing a short distance and has thereon a handle 80 provided with a metallic socket member 82 in electrical connection with the wire 78. The handle 80 may be used to connect the wire 78 with any one of the contact plugs 66 by inserting it through one of the openings 56 and positioning the socket member 82 over the plug 66. The wire 78 extends within the casing A and extends out of one of the panels 20 through a bushing 84.

From the construction of the arts just described it will be obvious that any of the impedance coils may be included in the welding circuit for varying the current supplied to the arc.

In connection with my apparatus I find it desirable to provide a work table 88 on which the piece to be welded may be laid. The table 88 may be electrically connected as indicated at 86 to the wire 78 and thereby to one terminal of the welding circuit.

The clamp member B is provided with a handle 94 for the convenience of the operator in manipulating the clamping device during welding operations. Secured to the handle 94 is a bar 96 provided with notches 98. A pair of ears 100 are formed on the bar 96 and pivotally support therebetween another bar 102. The bar 102 is likewise provided with notches 98 and has secured to one end thereof an insulating button 104. Interposed between the bars 96 and 102 is a spring 106 for causing pivotal movement of the bar 102 in one direction relative to the bar 96.

In operation the bar 102 may be depressed by pressing the button 104 and a welding rod 108 may be inserted between the notches 98 of the two bars. Release of the button 104 causes the spring 106 to firmly grip the rod 108 between the bars for holding it in operative position relative to the clamping device B and for providing an electrical connection between the bars and the welding rod.

The wire 52 extends through the handle 94 and the end 110 thereof is secured to the bar 96 for providing an electrical connection for the other side of the welding circuit.

Practical operation.

In the operation of my device, a welding rod is inserted in the clamp member B. The piece to be welded is placed on the table 88 and the handle 80 is adjusted to the desired contact plug 66 for including the desired number of impedance coils in the welding circuit.

In Figure 2 the numerals 5, 7, 8, 9, 10, 11, 12 and 13 on the disc 60 adjacent the plugs 66 indicate the number of coils that will be included in the circuit when the handle 80 is inserted in the corresponding opening 56. The indicating characters 5, 7, 8, 9, 10, 11, 12 and 13, of course, serve in Figure 2 to merely indicate what will be printed on the outside of the front panel of the casing A whereby the operator of the device may readily know just how many coils are included in the welding circuit at any setting of the handle 80. In the present instance I have shown the handle 80 as inserted in the opening 56 adjacent the numeral 7 thereby indicating that seven impedance coils are included in the welding circuit. The switch 42 is then turned on and the operator is ready to begin welding.

Of course, the operator should have a welding shield as in welding with any of the well known welding apparatuses. The operator holding the handle 94 brings the rod 108 in contact with the work 112 and adjacent the break thereof to be welded. This starts the current flowing through the work and the welding rod and by withdrawing the welding rod slightly from the work an arc is formed which melts the welding rod and heats the work adjacent the break. The melted rod flows into the break and welds it and the operator moves the welding rod along the break until it is completely welded. When the welding rod is too short it may be readjusted by pressing the button 104 and moving the rod longitudinally relative to the clamping device B.

If the work is of such nature that not a very good contact is had when laid on the table 88, a clamp may be connected to the free end of the wire 78 and this clamp may be secured directly to the work for forming a good electrical connection.

In the device embodying my invention no moving parts are employed as in the case of rotary converters for welding purposes and no expensive closed core construction and primary and secondary windings are needed as in the use of transformers for welding purposes.

I have provided a device which is readily assembled and is light whereby it may easily be carried from one part of a shop to another. For this purpose I provide the handles 114 on the ends of the casing A. A change in the volume of the welding current may readily be made by removing the handle 80 and reinserting through a different opening 56.

When the handle is inserted in the opening adjacent the numeral 13 all of the coils are included in the circuit and the least amount of current is used. The greatest amount is used when the handle is inserted in the opening adjacent the numeral 5 as in such event only five coils impede the current.

By the use of comparatively large wires in winding the impedance coils of my device, the machine can be used for continuous welding with but a very slight rise in temperature. By spacing the coils in circular arrangement around the supporting bands 22, they are readily air cooled and do not require complicated mechanical means for causing an air circulation.

Different current values are used as different welding jobs are encountered and some of the coils are out of the circuit part of the time and are thereby allowed to cool.

The wires 52 and 78 may be reversed, that is, the wire 52 may lead from the holding device B through the bushing 84 and to the socket member 82 and wire 78 may lead from the work 112 through the bushing 54 and to the impedance coil 4. The welding rod 108 would then be charged with electricity only when the handle 80 is inserted through one of the openings 56.

Some changes may be made in the construction and arrangement of the parts of my device without departing from the real spirit and purpose of my invention and it is my intention to cover by my claims, any modified forms of structure or use of mechanical equivalents, which may be reasonably included within their scope.

I claim as my invention:

1. An electric arc welder comprising a casing, a pair of circular supporting bands supported therein, a series of impedance coils having their cores secured to said supporting bands, a disc supported within said casing and adjacent one wall thereof, a plurality of contact plugs mounted on said disc, each contact plug being electrically connected to the connecting wire between adjacent impedance coils, said wall having an opening adjacent each contact plug, a socket member adapted to be inserted in any of said openings and to engage a contact plug, said impedance coils, contact plugs and socket member being part of an electric arc circuit whereby any desired number of the coils may be included in the circuit.

2. An electric arc welder comprising a casing, a series of impedance coils supported therein, a disc supported within said casing and adjacent one wall thereof, a plurality of contact plugs mounted on said disc, each contact plug being electrically connected to the connecting wire between adjacent impedance coils, said wall having an opening adjacent each contact plug and a socket member adapted to be inserted in any of said openings and to engage a contact plug.

3. A device of the class described comprising a casing, a pair of circular supporting bands therein, a series of coils supported on said bands by means of U-bolts partly encircling the cores of the coils and extending through said bands, a plurality of contact plugs mounted adjacent one wall of said casing, said wall having openings adjacent said plugs and a socket member adapted to be inserted in one of said openings and coact with the contact plug corresponding thereto whereby any desired number of coils may conduct an electrical current being passed through the device.

RALPH S. BRUMMETT.